May 9, 1933.  M. W. BOWEN  1,908,309
BRAKE APPARATUS
Filed Nov. 26, 1930   4 Sheets-Sheet 1

Inventor:
Myron W. Bowen.
By Williams,
Bradbury, McCaleb
& Hinkle, attys

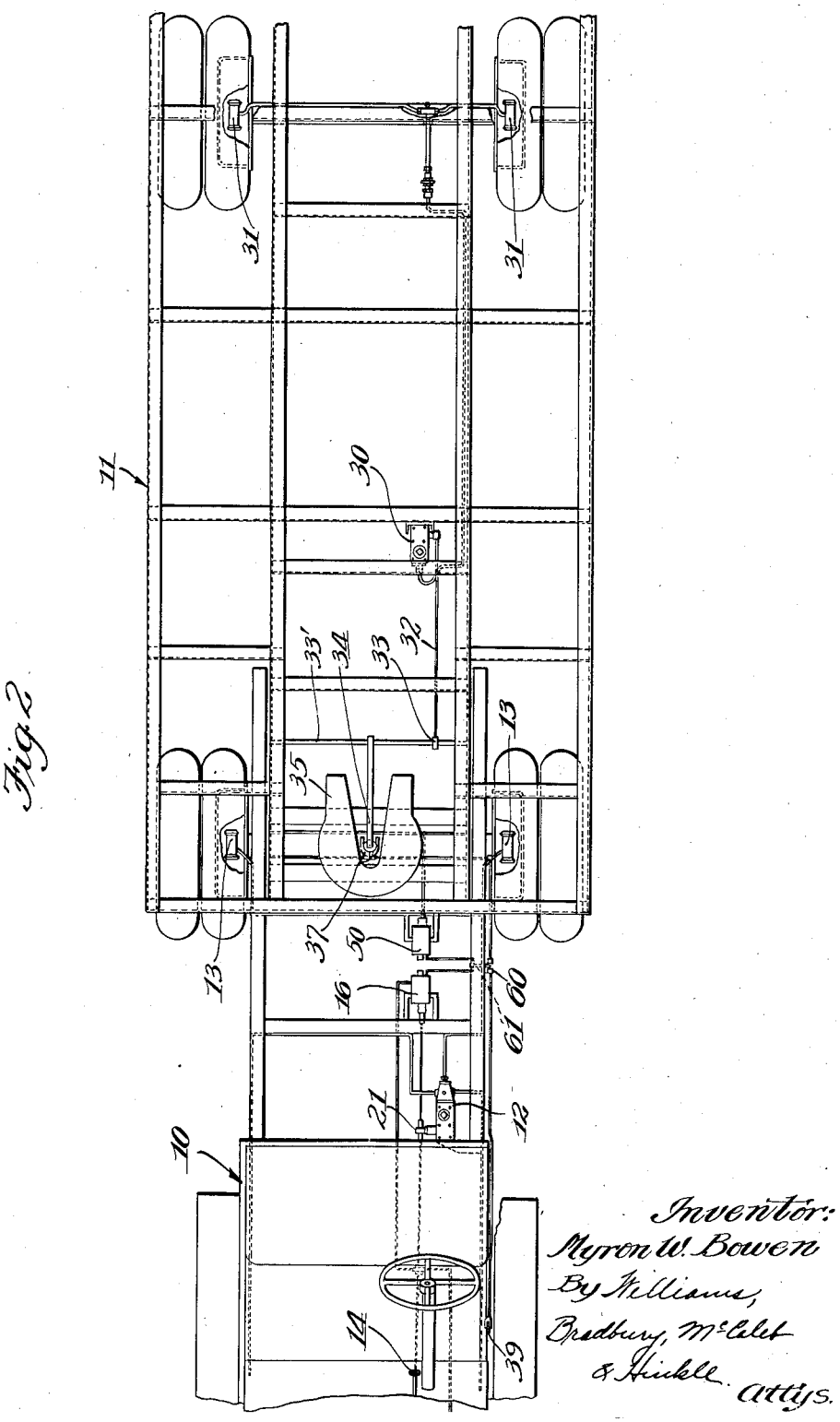

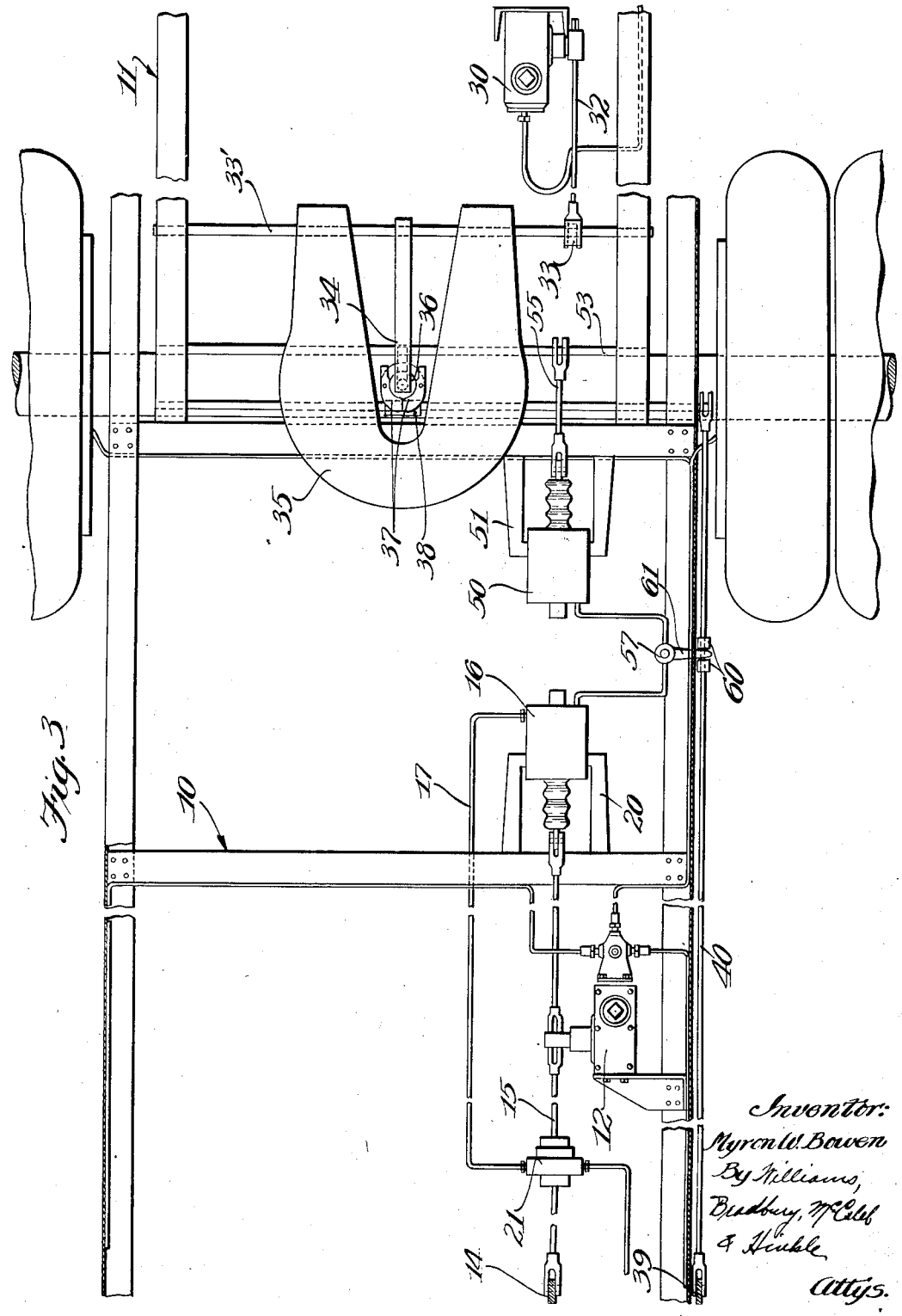

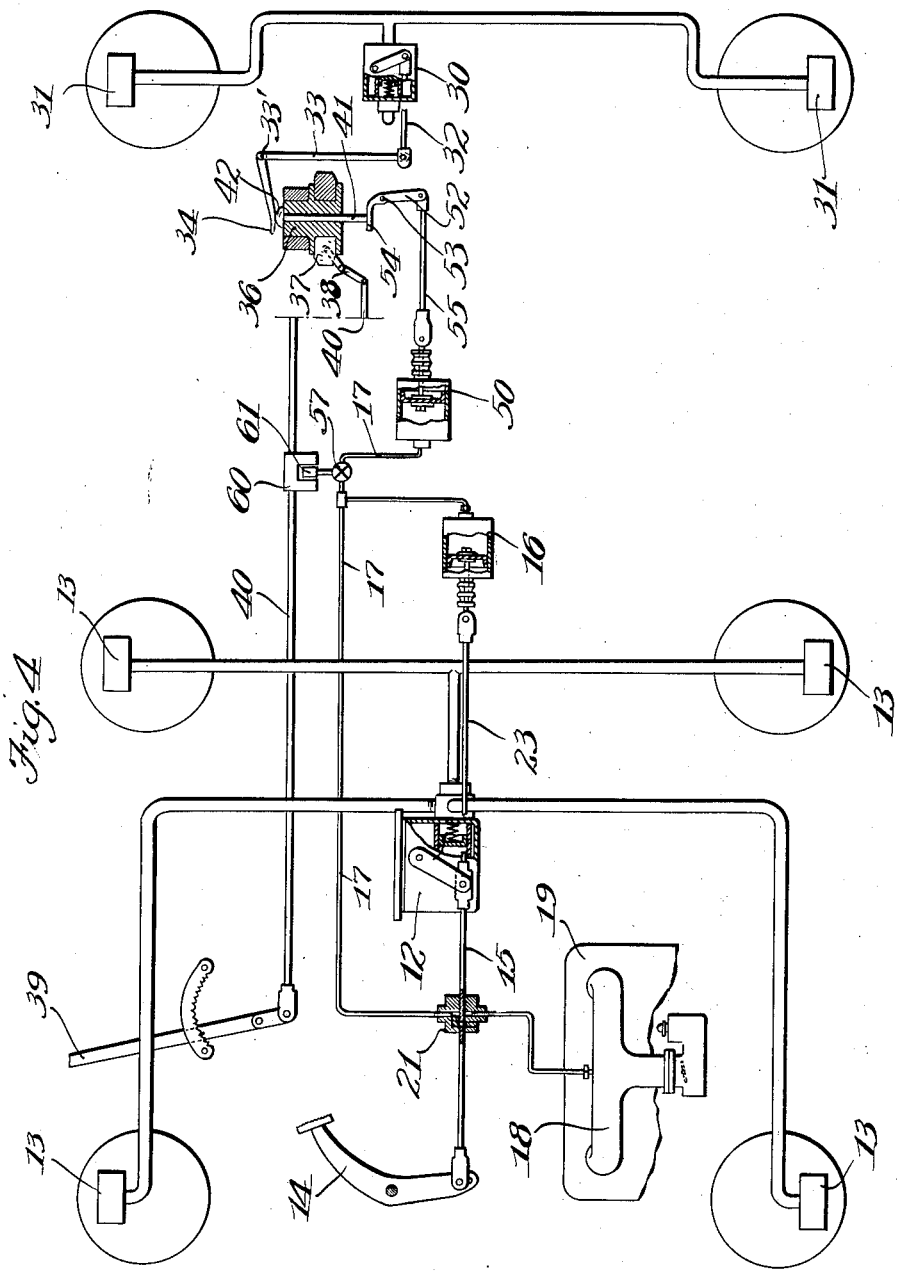

Patented May 9, 1933

1,908,309

UNITED STATES PATENT OFFICE

MYRON W. BOWEN, OF DETROIT, MICHIGAN, ASSIGNOR TO HYDRAULIC BRAKE COMPANY, OF DETROIT, MICHIGAN, A CORPORATION OF CALIFORNIA

BRAKE APPARATUS

Application filed November 26, 1930. Serial No. 498,320.

My invention relates to brake apparatus and more particularly to brake apparatus for use with trucks and semi-trailers.

It is a well-known practice to use, especially in automotive hauling, a truck which acts as a tractor and which is designed to be engaged with a semi-trailer or groups of semi-trailers. In this practice the truck-tractor is engaged with the semi-trailer in an automatic manner through means of a fifth wheel by which the semi-trailer is pivotally connected with the tractor. The rear wheels of the semi-trailer are provided with brakes similar to those on the truck-tractor and are usually controlled by a hand lever in the driver's cab through suitable linkage passing through the center of the king-pin which connects the fifth wheel of the semi-trailer and tractor. It is also the practice to provide a secondary coupler lever for effecting the locking of the fifth wheel and tractor from the driver's cab. In such semi-trailer apparatus, in which hydraulic brakes are used, a master cylinder of well known type is usually mounted on the semi-trailer and operated by the manual lever in the driver's cab of the tractor. My invention relates to such semi-trailers using hydraulic brakes and to improvements therein.

It is an object of my invention to provide an improved means of operating the brakes of a semi-trailer.

It is an object of my invention to provide an improved means of operating the hydraulic brakes of a semi-trailer.

Another object of my invention is to provide means for utilizing the movement of the coupler lever to connect the hydraulic brakes of a semi-trailer in series operation with the brakes of the tractor.

It is another object of my invention to provide a vacuum booster for operating the brakes of the semi-trailer.

It is still another object of my invention to provide a vacuum booster for operating the brakes of the tractor, together with a second vacuum booster for operating the brakes of the semi-trailer, and valve means operated by the coupling lever to connect the two boosters.

It is a further object of my invention to provide vacuum boosted brake operating means for semi-trailers which may automatically be associated with and disconnected from the vacuum boosting means of the tractor by the same lever which effects the coupling and uncoupling of the semi-trailer.

Further objects and advantages will appear from the following detailed description and accompanying drawings, in which Fig. 1 is a fragmentary diagrammatic side elevation of a truck-tractor and semi-trailer employing the braking system of my invention;

Fig. 2 is another fragmentary, somewhat diagrammatic, view of the truck-tractor and semi-trailer illustrated in Fig. 1, illustrating the application of the braking system of my invention;

Fig. 3 is an enlarged diagrammatic plan view of a truck and semi-trailer, illustrating the braking system of my invention; and Fig. 4 is a schematic layout of the parts of the braking system of my invention shown applied to a truck and fifth wheel semi-trailer.

Figure 1:
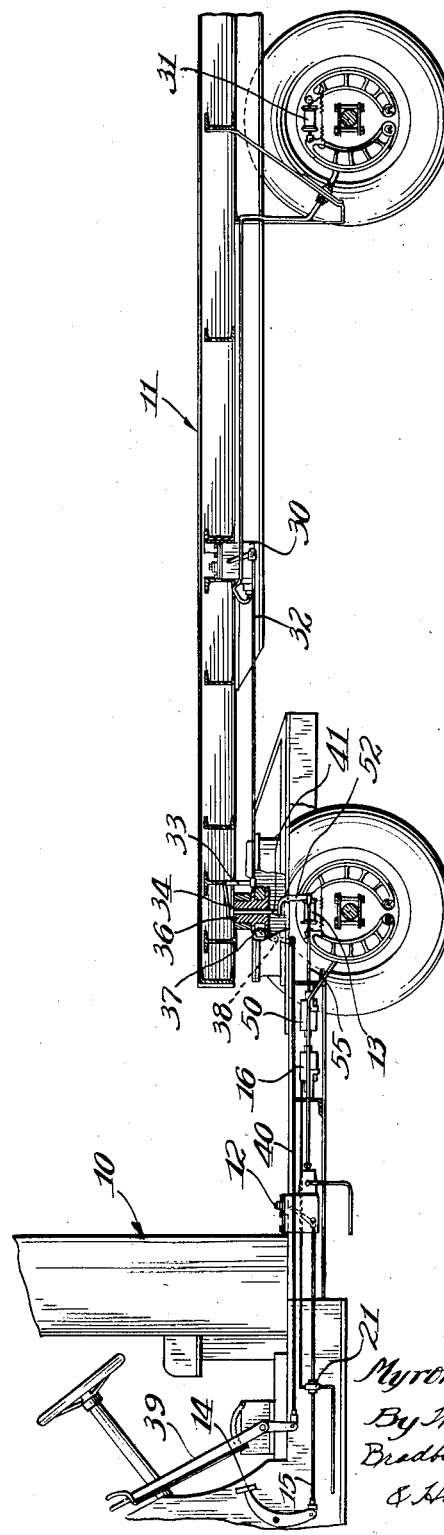

Referring to the drawings, in which like numerals designate like parts throughout the several views, I have shown in Fig. 1 a truck-tractor 10 of any well-known design which is for use with a semi-trailer 11. The braking system applied to the tractor 10 in the drawings is of the hydraulic type and one wherein a master cylinder or pump 12 containing the braking fluid or liquid is connected by a series of conduits with wheel cylinders 13 which are adapted to receive the liquid pressure from the master cylinder and operate the brakes at each wheel. A brake pedal 14, suitably mounted in the operator's cab of the tractor, is connected with the master cylinder 12 by means of a rod 15 and movement of the brake pedal will operate a plunger within the master cylinder and force liquid under pressure to the wheel cylinders 13 to apply the brakes.

A vacuum booster 16 of any well-known type comprising an enlarged diameter piston adapted to be moved by a vacuum created in the intake manifold 18 of an automotive engine 19, is suitably mounted by a bracket 20 to the chassis of the tractor 10. The vacuum booster is connected with the intake manifold 18 of the engine 19 by a vacuum tube or pipe 17 which is suitably connected in a leakproof manner at one end with the vacuum booster 16 and at the other end with the intake manifold 18 of the automotive engine 19, as best shown in Fig. 4.

A valve housing 21 is disposed within the vacuum supply line 17 between the vacuum booster and the intake manifold. The brake rod 15 which operates the master cylinder pump 12 to generate the fluid pressure for operating the brakes 13 passes through the valve housing 21 and acts as a valve to shut off the vacuum supply line 17 from the intake manifold when the brakes are in a released position, as shown in Fig. 4.

Such a valve is well known in the art and acts upon operation of the foot brake 14 to open the vacuum supply line 17 and allow the suction of the intake manifold 18 of the engine 19 to operate the vacuum booster 16. The booster is connected with the master cylinder 12 by a rod 23 which is in alignment with or a continuation of the brake rod 15. Thus the suction created by the intake manifold greatly increases the force applied to the master cylinder 12 to set the brakes 13 of the automotive vehicle. Such a hydraulic vacuum boosted braking system is well known in the art and is used particularly with heavy commercial automotive vehicles such as trucks and truck-tractors illustrated in the drawings. A movement of the foot lever 14 operates the hydraulic braking system assisted by the power generated in the vacuum booster when thrown into operative connection with the intake manifold of the engine.

All of the above description is conventional and my invention has particularly to do with such a vacuum boosted system when applied to a truck-tractor for use with semi-trailers and particularly with improvements therein and application of vacuum boosted brake power to the brakes of the trailer.

The trailer 11 has a master supply cylinder and pump 30 mounted thereon in a suitable manner and connected with suitable conduits to the wheel cylinders 31 of the brakes of the trailer so that operation of the pump will generate fluid pressure to actuate the brakes 31.

A brake rod 32 connects the master cylinder pump 30 with a bell crank lever 33 pivotally mounted at 33′ in a suitable manner in the forward end of the semi-trailer. The bell crank lever extends towards the forward end of the trailer and forms a brake cam lever 34. The rear end of the truck-tractor is provided with a fifth wheel track 35 of any suitable type well known in the art which is adapted to engage the rollers or wheels of the front end of the semi-trailer during coupling operation.

A king-pin 36 is suitably mounted on the truck-tractor in the center of the fifth wheel track. A pair of mechanical jaws 37 are mounted in a suitable manner at the front end of the trailer. Coupling of the trailer and truck-tractor is effected by backing the tractor into the trailer so that the front end of the trailer engages the fifth wheel track, overriding the track and rear end of the truck-trailer until the mechanical jaws 37 engage the king-pin 36. A locking member 38 is suitably mounted in the fifth wheel coupling mechanism and is connected with an operating lever 39 located in the driver's cab by means of a coupling rod 40. Thus when the front end of this semi-trailer overrides the fifth wheel track of the tractor and the jaws 37 of the trailer have engaged the king-pin 36 of the tractor, the driver may operate the lever 39 which will reciprocate the coupling rod 40 and move the locking member 38 to clasp the jaws about the king-pin and complete the coupling of the trailer and the truck.

Such a fifth wheel coupling connection may be of any well-known type, the one illustrated in the drawings and described herein being conventional.

A brake push pin 41 is suitably mounted in a bore in the center of the king-pin 36 and is adapted to be reciprocated vertically. A head 42 is formed thereon which projects above the top of the king-pin and seats thereon when the brake push pin is in lowered position. It will be noted, in Figs. 1 and 4 particularly, that the brake cam lever 34 formed on the bell crank lever 33 of the semi-trailer is adapted to override the brake push pin 41 disposed within the center of the king-pin 36 as the trailer overrides the tractor.

It will thus be noted that an upward movement of the brake push pin, when the semi-trailer and tractor have been coupled together, will raise the brake cam lever 34, rotate the bell crank lever 33, and reciprocate the brake rod 32 to operate the master pump 30 and apply the brakes 31 of the semi-trailer. In the past the brake push pin has been operated by manual means through a separate brake lever in the driver's cab and proper mechanical linkage. To accomplish this result I provide a secondary vacuum booster pump 50 which is suitably mounted on the chassis 10 of the automotive truck by means of a bracket 51. A bell crank lever 52 is provided for operating the brake push pin and is pivotally mounted on the truck-tractor 10 on a pivot 53. One arm of the bell crank lever 52 is in alignment and contact with the lower end of the brake push pin 41 underneath the king-pin 36 and forms a cam 54 for engaging the push pin. The bell crank lever 52 is suitably connected with the vacuum booster 50 by means of a brake rod 55 so that movement of the piston of the vacuum booster 50 will rotate the bell crank lever 52 upon the pivot 53 and raise the cam arm 54 which is in contact with the lower end of the brake push pin 41.

The vacuum booster cylinder is connected with the intake manifold 18 of the automotive engine 19 by means of the vacuum supply line 17. A mechanical valve 57 is disposed between the vacuum booster 50 and the vacuum booster 16 in a manner whereby the valve 57 may cut off the vacuum booster 50 so that the truck unit or vacuum booster 16 will operate independently of the secondary booster 50. When the valve 57, however, is rotated to connect the vacuum supply line 17 with the intake manifold 18 and booster 50 the secondary booster 50 will thereupon be in series connection, so to speak, with the truck-tractor booster 16 and will operate simultaneously therewith.

A valve actuating member 60 is suitably secured to the coupling rod 40 and is adapted to engage a valve arm 61 which extends from the valve 57. The valve actuating member 60 is so disposed on the coupling rod 40 in engagement with the valve arm 61 so that the valve 57 is in shut off position when the coupling rod 40 is released and the truck-tractor disconnected and free from the semi-trailer with the operating lever 39 in a forward position, as illustrated in Figs. 1 and 4 of the drawings. When the valve 57 is in shut off position it will be noted that the truck unit of my braking system comprising the master cylinder and pump 12 and vacuum booster 16 for operating the brakes 13 of the truck, will operate independently and not affect the secondary vacuum booster unit. Such will be the condition which exists when the truck is disconnected from the trailer. When the truck is connected with the trailer by the usual coupling means the jaws 37 will surround the king-pin 36 and the driver will draw back the lever 39, reciprocating the operating rod 40 and actuating the locking member 38, and lock the semi-trailer into operating engagement with the truck. The brake cam lever 34 will override the head 42 of the brake push pin 41 and be in operating engagement with the brake push pin.

The reciprocation of the coupling rod 40 will move the valve actuating member 60 and rotate the valve arm 61, opening the valve 57, and throwing the vacuum booster 50 into connection with the intake manifold 18 and, in effect, in series connection with the vacuum booster 16 of the truck braking unit. Thus the semi-trailer and truck are coupled together and the single movement of the coupling lever 39, which effected the engagement of the semi-trailer and truck, operates to connect the trailer braking system with the truck braking system.

Now upon operation of the brake pedal 14, the vacuum booster 16 will be operated by the intake manifold 18 to assist in applying the brakes 13 of the truck, and the vacuum booster 50 of the trailer unit will rotate the bell crank lever 52, raising the brake push pin 41 which, in turn, rotates the bell crank lever 33, reciprocating the brake rod 32 of the trailer unit to operate the master pump cylinder 30 mounted on the semi-trailer which will actuate the brakes 31 of the semi-trailer. Thus the movement of the foot pedal 14 will operate all six brakes of the connected truck and semi-trailer units.

When the semi-trailer is disconnected from the truck the forward movement of the coupling lever 39, which is necessary to effect a disconnection of the mechanical jaws 37 from the king-pin 36, will move the arm 61 to rotate the valve 57 to a shut off position, thereby completely cutting off the trailer brake operating unit. No separate additional brake operating means are needed and the braking system of the semi-trailer is automatically thrown into operation with the braking system of the truck unit merely upon coupling of the trailer and truck.

The apparatus of my invention has been described and illustrated in connection with a fifth wheel trailer and truck connection. It will be readily seen that my invention has many other applications and modifications may be made without departing from the spirit and scope of the invention which is to be limited only by the appended claims.

I claim:

1. In a combined truck and trailer, a brake mechanism therefor comprising brakes on the trailer, hydraulic mechanism on said trailer for operating said brakes, a vacuum operated piston on said truck, coupling means for said truck and trailer, operably connected means between said piston and said hydraulic mechanism when said truck and trailer are coupled, a vacuum conduit for conducting air from one side of said vacuum piston to actuate the same, a shut-off valve in said conduit, locking means for said coupling means, and means for simultaneously actuating said locking means and opening said valve.

2. In a combined truck and trailer, a brake mechanism therefor comprising brakes on the trailer, a vacuum booster on the truck, operably connecting means between the booster and said brakes, means for locking said truck to said trailer, vacuum creating means communicating with said booster, valve means for shutting off communication between the vacuum creating means and the booster, and a manually operable lever operably connected to both said valve and said locking means to actuate the same simultaneously.

3. In a combined truck and trailer, a brake mechanism therefor comprising brakes on the trailer, a vacuum booster on the truck, operably connecting means between the booster and the said brakes, means for locking said truck to said trailer, vacuum creating means communicating with said booster, valve means for shutting off communication between the vacuum creating means and the booster, and a reciprocable rod operably connected with said valve and said locking means, and adapted to actuate the same, lock the truck to the trailer and open said valve during the movement of said rod in one direction.

4. In a combined truck and trailer, a brake mechanism therefor comprising brakes on the trailer, hydraulic mechanism on said trailer for operating said brakes, a vacuum operated piston on said truck, coupling means for said truck and trailer, operably connected means between said piston and said hydraulic mechanism when said truck and trailer are coupled, a vacuum conduit for conducting air from one side of said vacuum piston to actuate the same, a shut-off valve in said conduit, locking means for said coupling means, and a manually operable lever operably connected to both said valve and said locking means to actuate the same simultaneously.

5. In a combined truck and trailer, a brake mechanism therefor comprising brakes on the trailer, hydraulic mechanism on said trailer for operating said brakes, a vacuum operated piston on said truck, coupling means for said truck and trailer, operably connected means between said piston and said hydraulic mechanism when said truck and trailer are coupled, a vacuum conduit for conducting air from one side of said vacuum piston to actuate the same, a shut-off valve in said conduit, locking means for said coupling means, and a reciprocable rod operably connected with said valve and said locking means, and adapted to actuate the same to lock the truck to the trailer and open said valve during the movement of said rod in one direction.

6. In a combined truck and trailer, a brake mechanism therefor comprising brakes on the trailer, a vacuum booster on the truck, operable connecting means between the booster and said brakes when the truck and trailer are coupled, means for coupling said truck and trailer, locking means for said coupling means, a conduit for conducting air from said booster and actuating the same, a shut-off valve in said conduit, and a reciprocable rod operably connected with said valve and said locking means, and adapted to actuate the same to lock the truck to the trailer and open said valve during the movement of said rod in one direction.

7. In a combined truck and trailer, a brake mechanism therefor comprising brakes on the trailer, a vacuum booster on the truck, operable connecting means between the booster and said brakes when the truck and trailer are coupled, means for coupling said truck and trailer, locking means for said coupling means a conduit for conducting air from said booster and actuating the same, a shut-off valve in said conduit and a manually operable lever operably connected to both said valve and said locking means to actuate the same substantially simultaneously.

8. In a device of the class described in combination a truck, a trailer, brakes on said truck and on said trailer, independent hydraulic means for actuating the brakes on the truck and on the trailers, vacuum mechanism on said truck including a booster operably connected with the hydraulic means on the truck to actuate the same, a second booster on said truck operably connected with the hydraulic means on the trailer to actuate the same, means for creating a vacuum in said vacuum mechanism, means for controllably closing communication between said vacuum creating means and both of said boosters, a shut off valve for closing communication between said vacuum creating means and said second booster, means for locking said trailer to said truck and means for simultaneously actuating said locking means and said shut off valve.

9. In a device of the class described in combination a truck, a trailer, brakes on said truck and on said trailer, independent hydraulic means for actuating the brakes on the truck and on the trailers, vacuum mechanism on said truck including a booster operably connected with the hydraulic means on the truck to actuate the same, a second booster on said truck operably connected with the hydraulic means on the trailer to actuate the same, means for creating a vacuum in said vacuum mechanism, means for controllably closing communication between said vacuum creating means and both of said boosters, means for locking said trailer to said truck, a shut-off valve between said vacuum creating means and said second booster, and means for simultaneously actuating said locking means and opening said shut-off valve.

10. In a device of the class described in combination a truck, a trailer, brakes on said truck and on said trailer, independent hydraulic means for actuating the brakes on the truck and on the trailers, vacuum mechanism on said truck including a booster operably connected with the hydraulic means on the truck to actuate the same, a second booster on said truck operably connected with the hydraulic means on the trailer to actuate the same, means for creating a vacuum in said vacuum mechanism, means for controllably closing communication between said vacuum creating means and both of said boosters, means for locking said trailer to said truck, a shut-off valve between said vacuum creating means and said second booster, and a manually operable lever operably connected to both said valve and said locking means to actuate the same simultaneously.

11. In a device of the class described in combination a truck, a trailer, brakes on said truck and on said trailer, independent hydraulic means for actuating the brakes on the truck and on the trailers, vacuum mechanism on said truck including a booster operably connected with the hydraulic means on the truck to actuate the same, a second booster on said truck operably connected with the hydraulic means on the trailer to actuate the same, means for creating a vacuum in said vacuum mechanism, means for controllably closing communication between said vacuum creating means and both of said boosters, means for locking said trailer to said truck, a shut-off valve between said vacuum creating means and said second booster and a reciprocable rod operably connected with said valve and said locking means, and adapted to actuate the same to lock the truck to the trailer and to open said valve during the movement of said rod in one direction.

In witness whereof, I hereunto subscribe my name this 22d day of November 1930.

MYRON W. BOWEN.